United States Patent
Lin et al.

(10) Patent No.: US 11,253,777 B2
(45) Date of Patent: Feb. 22, 2022

(54) GAME OPERATION OPTIMIZATION METHOD AND MOBILE DEVICE

(71) Applicant: Acer Incorporated, New Taipei (TW)

(72) Inventors: Wei-Ren Lin, New Taipei (TW); An-Cheng Lee, New Taipei (TW); Sheng-Lin Chiu, New Taipei (TW); Ying-Shih Hung, New Taipei (TW); Chia-Hsien Tsou, New Taipei (TW)

(73) Assignee: Acer Incorporated, New Taipei (TW)

( * ) Notice: Subject to any disclaimer, the term of this patent is extended or adjusted under 35 U.S.C. 154(b) by 136 days.

(21) Appl. No.: 16/812,392

(22) Filed: Mar. 9, 2020

(65) Prior Publication Data

US 2021/0101075 A1 Apr. 8, 2021

(30) Foreign Application Priority Data

Oct. 2, 2019 (TW) ................. 108135762

(51) Int. Cl.
 *A63F 13/22* (2014.01)
 *A63F 13/92* (2014.01)
 *G06F 3/023* (2006.01)

(52) U.S. Cl.
 CPC .............. *A63F 13/22* (2014.09); *A63F 13/92* (2014.09); *G06F 3/023* (2013.01); *A63F 2300/1018* (2013.01); *A63F 2300/204* (2013.01)

(58) Field of Classification Search
 CPC .. A63F 13/22; A63F 13/92; A63F 2300/1018; A63F 2300/204; G06F 3/023
 USPC ........................................................ 463/37
 See application file for complete search history.

(56) References Cited

U.S. PATENT DOCUMENTS

| | | | |
|---|---|---|---|
| 7,091,954 B2 * | 8/2006 | Iesaka ................... | G06F 1/1616 345/156 |
| 2011/0306423 A1 * | 12/2011 | Calderon .............. | A63F 13/211 463/37 |
| 2014/0223490 A1 * | 8/2014 | Pan ........................ | G06F 3/1462 725/61 |
| 2014/0235306 A1 * | 8/2014 | Walls ..................... | A63F 13/45 463/9 |
| 2014/0302921 A1 * | 10/2014 | Smith .................... | A63F 13/90 463/31 |
| 2016/0084605 A1 * | 3/2016 | Monti ................... | A63F 13/285 463/2 |

FOREIGN PATENT DOCUMENTS

| | | |
|---|---|---|
| CN | 103369363 | 10/2013 |
| CN | 105641931 | 6/2016 |
| CN | 105955494 | 9/2016 |
| CN | 106201265 | 12/2016 |
| TW | 201926030 | 7/2019 |

* cited by examiner

*Primary Examiner* — Allen Chan
(74) *Attorney, Agent, or Firm* — JCIPRNET

(57) ABSTRACT

The present disclosure provides a game operation optimization method and a mobile device. The method includes: in response to detecting that a game application is operating on the mobile device, reading a button configuration file corresponding to the game application; in response to detecting a first button event corresponding to the first button, converting the first button event into a second button event corresponding to the second button according to the button configuration file; and controlling a first content of the game application according to the second button event.

9 Claims, 3 Drawing Sheets

```
[com.namcobandaigames.pacmantournaments]
; W => Up
KEY1=KEY_W
KEY1_MAPPING=KEY_UP
; A => Left
KEY2=KEY_A
KEY2_MAPPING=KEY_LEFT
; S => Down
KEY3=KEY_S
KEY3_MAPPING=KEY_DOWN
; D => Right
KEY4=KEY_D
KEY4_MAPPING=KEY_RIGHT
[com.dts.freefireth]
; W => Gamepad UP
KEY1=KEY_W
KEY1_MAPPING=540,1400;0,-300
; A => Gamepad LEFT
KEY2=KEY_A
KEY2_MAPPING=540,1400;-300,0
; S => Gamepad DOWN
KEY3=KEY_S
KEY3_MAPPING=540,1400;0,300
; D => Gamepad RIGHT
KEY4=KEY_D
KEY4_MAPPING=540,1400;300,0
; SPACE => JUMP
KEY5=KEY_SPACE
KEY5_MAPPING=3160,1280
```

FIG. 4

GAME OPERATION OPTIMIZATION METHOD AND MOBILE DEVICE

CROSS-REFERENCE TO RELATED APPLICATION

This application claims the priority benefit of Taiwan application no. 108135762, filed on Oct. 2, 2019. The entirety of the above-mentioned patent application is hereby incorporated by reference herein and made a part of this specification.

TECHNICAL FIELD

The present disclosure relates to a mechanism for adjusting a game operation mode, and more particularly, to a game operation optimization method and a mobile device.

BACKGROUND

With the full popularity of 4G mobile networks and the diversified development of smart phone applications, the performance of mobile games has gradually caught up with desktop online games. Due to the diversified content of mobile games and the portability of mobile phones, mobile games have quickly captured and eroded the market for desktop online games.

Chromebook developed by Google currently supports installation of Android apps, which means that mobile gamers can also enjoy cross-platform convenience on Chromebook. Based on the growing strength of the mobile game market and the convenience of cross-platform, it is very important that players can enjoy smooth control during the game.

With respect to the control of the game, for game players who is used to control the direction by the left hand on the left of the keyboard (e.g., the player who controls the direction by "A", "W", "S", "D" keys), as Android games in Chromebook is preset to the right of the keyboard or the touch screen as the main setting for controlling the direction, there is a little inconvenient in use.

Therefore, it is an important issue for those skilled in the art how to propose an optimized method for improving the control of Android game operations on Chromebook.

SUMMARY

Accordingly, the disclosure proposes a game operation optimization method and a mobile device capable of solving the technical problem described above.

The disclosure provides a game operation optimization method adapted for a mobile device having a keyboard. The method includes: in response to detecting that a first game application is operating on the mobile device, reading a first button configuration file corresponding to the first game application, wherein a mobile operating system is operating on the mobile device, and the first button configuration file records a first corresponding relationship between a first button and a second button; in response to detecting a first button event corresponding to the first button, converting the first button event into a second button event corresponding to the second button according to the first corresponding relationship recorded by the first button configuration file; and controlling a first content of the game application according to the second button event.

The disclosure provides mobile device including a storage circuit, a keyboard and a processor. The storage unit stores a plurality of modules. The processor is coupled to the storage circuit and the keyboard, and accesses the modules to execute steps of: in response to detecting that a first game application is operating on the mobile device, reading a first button configuration file corresponding to the first game application, wherein a mobile operating system is operating on the mobile device, and the first button configuration file records a first corresponding relationship between a first button and a second button; in response to detecting a first button event corresponding to the first button, converting the first button event into a second button event corresponding to the second button according to the first corresponding relationship recorded by the first button configuration file; and controlling a first content of the game application according to the second button event.

Based on the above, the method and the mobile device of the disclosure can convert the first button event generated when the first button is pressed into the second button event corresponding to the second button based on the corresponding relationship between the first button and the second button in the button configuration file. In this way, the user can control the content of the game application in a more customary way so that the user experience when operating the game application can be improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 4 is a schematic diagram illustrating an integrated file according to an embodiment of the disclosure.

DESCRIPTION OF THE EMBODIMENTS

Figure 1:
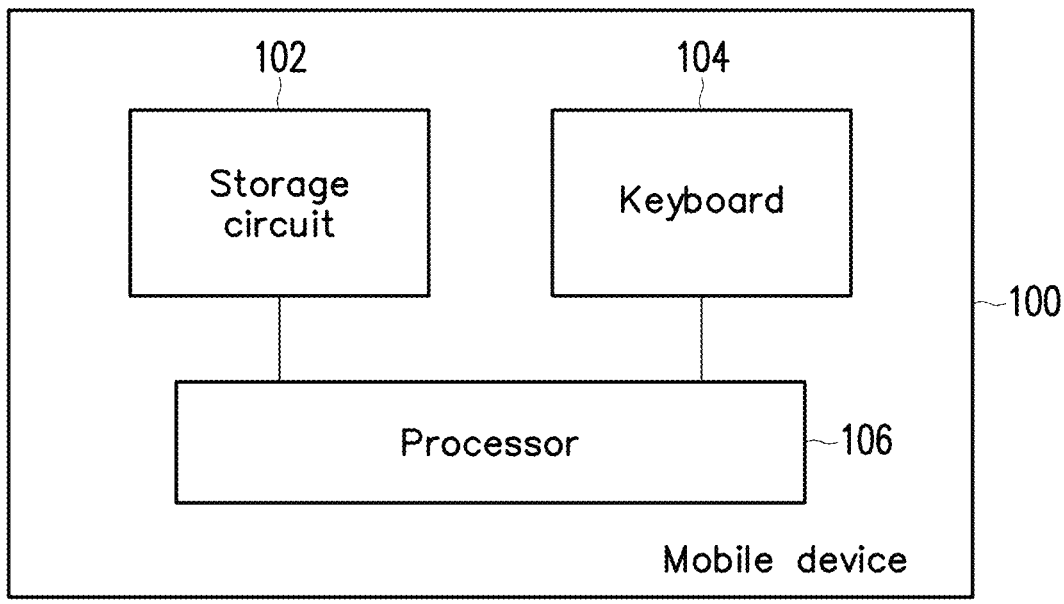
FIG. 1 is a schematic diagram illustrating a mobile device according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Referring to FIG. 1, FIG. 1 is a schematic diagram illustrating a mobile device according to an embodiment of the disclosure. In different embodiments, a mobile device 100 is, for example, a computer device installed with a mobile operating system (e.g., Chrome OS) such as Chromebook or the like, but not limit thereto. As shown by FIG. 1, the mobile device 100 includes a storage circuit 102, a keyboard 104 and a processor 106.

The storage circuit 102 is, for example, any forms of fixed or movable random access memory (RAM), read only memory (ROM), flash memory, hard disk or other similar devices, or a combination of above-said devices, which can be used to record a plurality of program codes or modules.

The keyboard 104 may include, for example, physical keys, and these physical keys can generate corresponding button events when pressed and notify the processor 106 the same so the processor 106 can execute corresponding operations according to the obtained button events.

The processor 106 is coupled to the storage circuit 102 and the keyboard 104, and may be a processor for general purposes, a processor for special purposes, a conventional processor, a digital signal processor, a plurality of microprocessors, one or more microprocessors, controllers and microcontrollers which are combined with a core of the digital signal processor, an application specific integrated circuit (ASIC), a field programmable gate array (FPGA), any other integrated circuits, a state machine, a processor based on advanced RISC machine (ARM) and the like.

In the embodiments of the disclosure, the processor 106 can access the modules and the program codes recorded in the storage circuit 102 to implement the game operation optimization method proposed by the present disclosure. In certain embodiments, the modules and the program codes described above may belong to a plug-in program in the mobile operating system. That is to say, the processor 106 can run this plug-in program (which may operate as a background program in the mobile operating system) to implement the method proposed by the present disclosure, which will be described in detail below.

Figure 2:
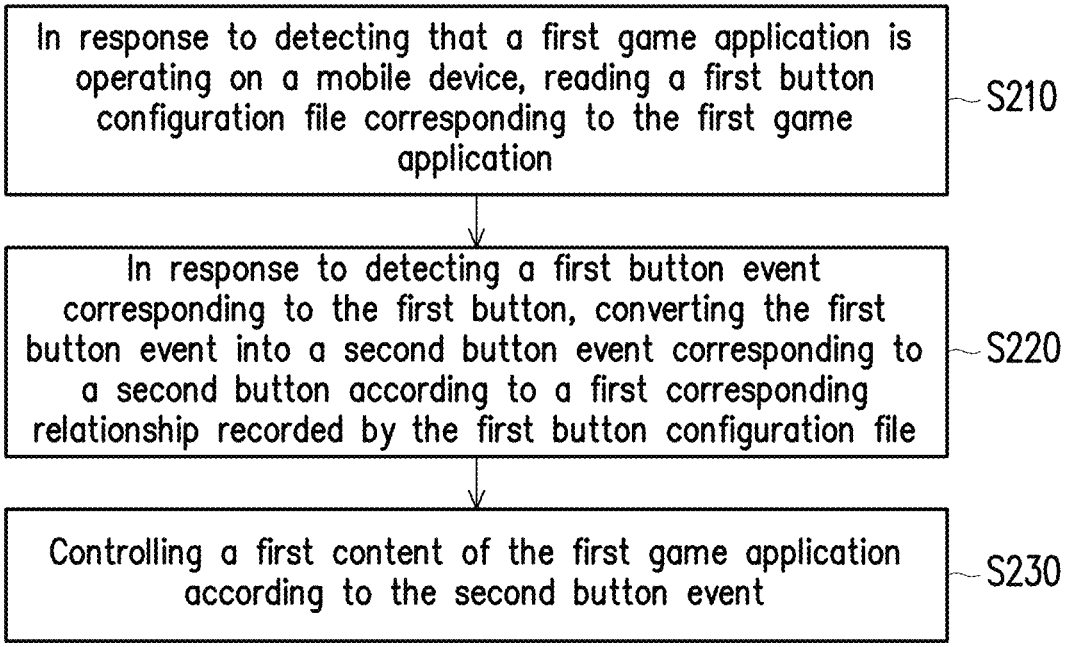
FIG. 2 is a flowchart illustrating a game operation optimization method according to an embodiment of the disclosure.

Referring to FIG. 2, FIG. 2 is a flowchart illustrating a game operation optimization method according to an embodiment of the disclosure. The method of this embodiment may be performed by the mobile device 100 of FIG. 1, and each step of FIG. 2 will be described with reference to each element shown in FIG. 1.

First of all, in step S210, in response to detecting that a first game application is operating on the mobile device 100, the processor 106 can read a first button configuration file corresponding to the first game application. In an embodiment, the first button configuration file may be edited by a user or a designer of the mobile device 100 and stored on the mobile device 100, and may record a first corresponding relationship between the first button and a second button.

In an embodiment, the first button is, for example, a first physical key on the keyboard 104 (e.g., "W", "S", "A" or "D" keys), and the second button may be a second physical key on the keyboard 104 (e.g., "Up", "Down", "Left" or "Right" arrow keys). In another embodiment, if the mobile device 100 has a touch screen, the second button may also be a touch button on the touch screen (e.g., a game control button displayed on the touch screen).

Next, in step S220, in response to detecting a first button event corresponding to the first button, the processor 106 can convert the first button event into a second button event corresponding to the second button according to the first corresponding relationship recorded by the first button configuration file. Then, in step S230, the processor 106 can control a first content of the first game application according to the second button event.

For instance, it is assumed that the first button is the "A" key on the keyboard 104, and the corresponding second button in the first button configuration file is the "Left" arrow key on the keyboard 104. In this case, when the processor 106 detects the first button event generated by the pressed "A" key, the processor 106 can convert the first button event into the second button event corresponding to the "Left" arrow key according to the first button configuration file. In brief, when the "A" key is pressed to generate the first button event, the processor 106 correspondingly issues the second key event that is generated only when the "Left" arrow key is pressed (yet the "Left" arrow key is not actually pressed).

Correspondingly, the processor 106 can control the first content according to the second button event to control, for example, character/object/screen in the first game application to move to the left, but is not limited thereto.

As another example, it is assumed that the first button is the "W" key on the keyboard 104, and the corresponding second button in the first button configuration file is the "Up" arrow key on the keyboard 104. In this case, when the processor 106 detects the first button event generated by the pressed "W" key, the processor 106 can convert the first button event into the second button event corresponding to the "Up" arrow key according to the first button configuration file. In brief, when the "W" key is pressed to generate the first button event, the processor 106 correspondingly issues the second key event that is generated only when the "Up" arrow key is pressed (yet the "Up" arrow key is not actually pressed).

Correspondingly, the processor 106 can control the first content according to the second button event to control, for example, character/object/screen in the first game application to move to the top, but is not limited thereto.

In different embodiments, the first button configuration file described above may simultaneously record corresponding relationships between a plurality of the first buttons and a plurality of the second buttons. In this way, when one of the first buttons on the keyboard 104 is pressed, the processor 106 can locate the corresponding one of the second buttons according to the first button configuration file and accordingly generate the second button event.

For instance, the first button configuration file described above may record the corresponding relationships between the first buttons (e.g., the "W", "S", "A" and "D" keys) and the second buttons (e.g., the "Up", "Down", "Left" and "Right" arrow keys). In this case, when one of the "W", "S", "A" or "D" keys is pressed to generate the first button event, the processor 106 can generate the second button event corresponding to the respective one of the "Up", "Down", "Left" or "Right" arrow keys, and accordingly control the first content of the first game application.

Figure 3:
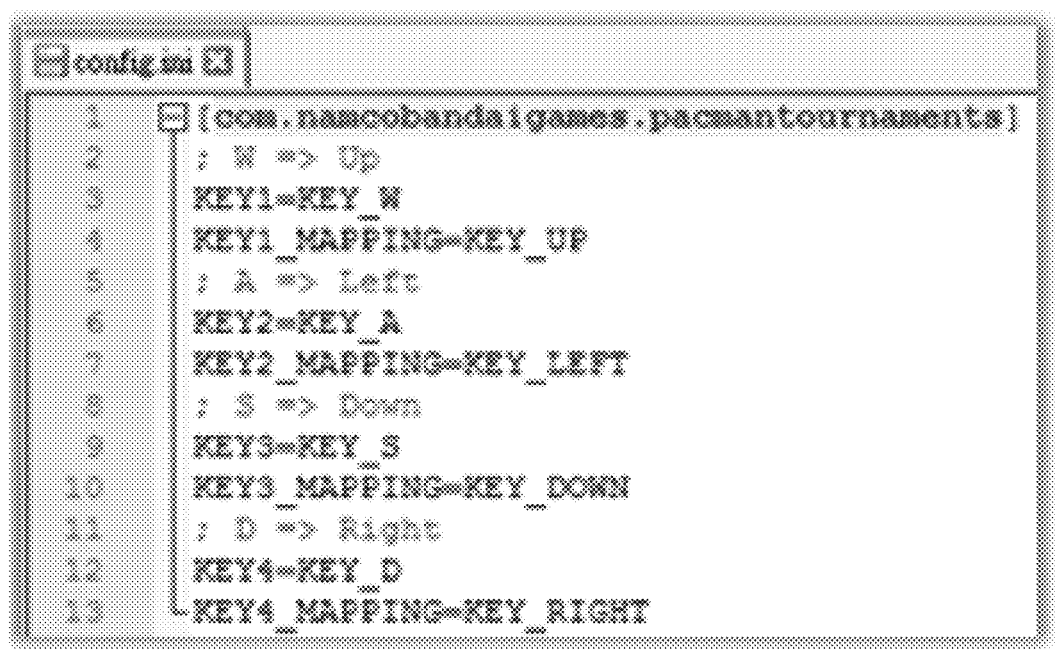
FIG. 3 is a schematic diagram illustrating a first button configuration file according to an embodiment of the disclosure.

In order to make the above concept easier to understand, the following description is further provided with reference to FIG. 3. Referring to FIG. 3, FIG. 3 is a schematic diagram illustrating a first button configuration file according to an embodiment of the disclosure.

In this embodiment, the mobile device 100 is a Chromebook running Chrome OS, however, it is only used as an example and is not intended to limit the possible implementations of the present disclosure. In this case, the designer can use a command line to get Android system information under Chrome OS. For example, the designer can open Chrome browser, press "Ctrl+Alt+T" key combination to enter "crosh" shell, and use a "shell" command to get the command line. The designer can then enter an Android command that can be used to get the button event in the command line to get the button event. Then, the designer can use a relevant "adb" command to obtain a game package name of the first game application.

As shown in FIG. 3, a file name of a first button configuration file 300 is, for example, "config.ini", and as shown in the content, the game package name of the first game application is, for example, "com.namcobandiaganes.pacmantournaments". In addition, it can be seen from "KEY1=KEY_W, KEY1_MAPPING=KEY_UP" recorded by the first button configuration file 300 that the "W" key (i.e., the first button) corresponds to the "Up" arrow key (i.e., the second button). Also, it can be seen from "KEY2=KEY_A, KEY2_MAPPING=KEY_LEFT" that the "A" key (i.e., the first button) corresponds to the "Left" arrow key (i.e., the second button). The corresponding relationships between the rest of first buttons and the rest of the second buttons can be derived based on the above teachings, which are not repeated hereinafter.

In other embodiments, button configuration files corresponding to different game applications can be simultaneously recorded on the mobile device 100. In this case, the processor 106 can read the corresponding button configuration file after detecting the game application currently operating on the mobile device 100, and then read the corresponding button configuration file to perform the method of the present disclosure.

Specifically, in response to detecting that the mobile device 100 is switched to run a second game application, the processor 106 can read a second button configuration file corresponding to the second game application. Here, the second button configuration file records a second corresponding relationship between a third button and a fourth button. In response to detecting a third button event corresponding to the third button, the processor 106 can convert the third button event into a fourth button event corresponding to the fourth button according to the second corresponding relationship recorded by second first button configuration file. Then, the processor 106 can control a second content of the second game application according to the fourth button event.

In other embodiments, the first and the second button configuration files described above may also be integrated into one integrated file, so that the processor 106 can locate the corresponding button configuration file to perform the method proposed by the disclosure after obtaining the game application currently operating on the mobile device 100.

Referring to FIG. 4, FIG. 4 is a schematic diagram illustrating an integrated file according to an embodiment of the disclosure. In this embodiment, an integrated file 400 can include a first button configuration section 410 corresponding to the first game application and a second button configuration section 420 corresponding to the second game application. For details of the first button configuration section 410, reference can be made to the related description of FIG. 3, which is not repeated hereinafter.

As can be seen from the content of the second button configuration section 420, the game package name of the corresponding second game application is, for example, "com.dts.freefireth". In addition, as can be seen from "KEY1=KEY_W, KEY1_MAPPING=540, 1400; 0, −300" recorded by the second button configuration section 420, the "W" key (i.e., the first button) corresponds to one touch button on the touch screen (i.e., the second button), which has a coordinate on the touch screen of, for example, "540, 1400" and a touch shift of, for example, "0, −300". Further, as can be seen from "KEY2=KEY_A, KEY2_MAPPING=540, 1400; −300, 0", the "A" key (i.e., the first button) corresponds to another touch button on the touch screen (i.e., the second button), which has a coordinate on the touch screen of, for example, "540, 1400" and a touch shift of, for example, "−300, 0". The corresponding relationships between the rest of first buttons and the rest of the second buttons can be derived based on the above teachings, which are not repeated hereinafter.

In summary, the method and the mobile device of the disclosure can convert the first button event generated when the first button is pressed into the second button event corresponding to the second button based on the corresponding relationship between the first button (e.g., the physical key) and the second button (e.g., another physical key or the touch button) in the button configuration file. In this way, the user can control the content of the game application in a more customary way. Moreover, since the present disclosure allows the processor to directly communicate with the keyboard/the physical touch screen at the bottom layer through I/O control without additional assistance from any device external to the mobile device, an easy and convenient implementation can be achieved.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A game operation optimization method, adapted for a mobile device having a keyboard, the method comprising:
   in response to detecting that a first game application is operating on the mobile device, reading a first button configuration file corresponding to the first game application, wherein a mobile operating system is operating on the mobile device, and the first button configuration file records a first corresponding relationship between a first button and a second button, wherein the first button is a first physical key on the keyboard, the second button is a second physical key on the keyboard or a touch button on a touch screen of the mobile device;
   in response to detecting a first button event corresponding to the first button, converting the first button event into a second button event corresponding to the second button according to the first corresponding relationship recorded by the first button configuration file; and
   controlling a first content of the first game application according to the second button event.

2. The method according to claim 1, wherein the mobile operating system comprises Chrome operating system, and the mobile device is Chromebook.

3. The method according to claim 1, wherein the second button is an arrow key on the keyboard.

4. The method according to claim 1, further comprising:
   in response to detecting that the mobile device is switched to run a second game application, reading a second button configuration file corresponding to the second game application, wherein the second button configuration file records a second corresponding relationship between a third button and a fourth button;
   in response to detecting a third button event corresponding to the third button, converting the third button event into a fourth button event corresponding to the fourth button according to the second corresponding relationship recorded by second first button configuration file; and
   controlling a second content of the second game application according to the fourth button event.

5. A mobile device, comprising:
   a storage circuit, storing a plurality of modules;
   a keyboard; and
   a processor, coupled to the storage circuit and the keyboard, and accessing the modules to execute steps of:
      in response to detecting that a first game application is operating on the mobile device, reading a first button configuration file corresponding to the first game application, wherein a mobile operating system is operating on the mobile device, and the first button configuration file records a first corresponding relationship between a first button and a second button, wherein the first button is a first physical key on the keyboard, the second button is a second physical key on the keyboard or a touch button on a touch screen of the mobile device;

in response to detecting a first button event corresponding to the first button, converting the first button event into a second button event corresponding to the second button according to the first corresponding relationship recorded by the first button configuration file; and controlling a first content of the first game application according to the second button event.

6. The mobile device according to claim 5, wherein the modules correspond to a plug-in program operating in the mobile operating system.

7. The mobile device according to claim 5, wherein the mobile operating system comprises Chrome operating system, and the mobile device is Chromebook.

8. The mobile device according to claim 5, wherein the second button is an arrow key on the keyboard.

9. The mobile device according to claim 5, wherein the processor is further configured to:

in response to detecting that the mobile device is switched to run a second game application, read a second button configuration file corresponding to the second game application, wherein the second button configuration file records a second corresponding relationship between a third button and a fourth button;

in response to detecting a third button event corresponding to the third button, convert the third button event into a fourth button event corresponding to the fourth button according to the second corresponding relationship recorded by second first button configuration file; and control a second content of the second game application according to the fourth button event.

* * * * *